United States Patent [19]

Stadele et al.

[11] Patent Number: 5,661,387
[45] Date of Patent: Aug. 26, 1997

[54] DEVICE FOR MANIPULATING OBJECTS IN A GRIPPER OR THE LIKE

[76] Inventors: Erhard Stadele, deceased, late of Bermatingen; by Berta Stadele, executor, Kesselbachstr. 5, D-7775 Bermatingen, both of Germany

[21] Appl. No.: 609,894

[22] Filed: Mar. 4, 1996

Related U.S. Application Data

[63] Continuation of Ser. No. 295,735, filed as PCT/EP93/004198, Feb. 23, 1993, published as WO93/16848, Sep. 2, 1993, abandoned.

[30] Foreign Application Priority Data

Feb. 29, 1992 [DE] Germany .................... 9202682 U
Jan. 14, 1993 [DE] Germany .................... 9300391 U

[51] Int. Cl.⁶ .................................................. G05B 19/04
[52] U.S. Cl. ........................ 318/568.21; 318/568.11; 901/29; 901/28
[58] Field of Search ............ 318/568.1, 568.11–568.25, 318/567; 901/27–30, 31–39, 49, 50

[56] References Cited

U.S. PATENT DOCUMENTS

| | | | |
|---|---|---|---|
| 4,636,134 | 1/1987 | Tellden | 901/17 X |
| 4,807,486 | 2/1989 | Akeel | 901/26 X |
| 4,854,808 | 8/1989 | Bruno | 414/680 |
| 4,911,033 | 3/1990 | Rosheim et al. | 74/479 |
| 5,016,489 | 5/1991 | Yoda | 74/490.03 |
| 5,127,282 | 7/1992 | Torii et al. | 901/29 X |
| 5,293,107 | 3/1994 | Akeel | 901/25 X |

FOREIGN PATENT DOCUMENTS

| | | |
|---|---|---|
| 0187871 | 7/1986 | European Pat. Off. . |
| 0299551 | 1/1989 | European Pat. Off. . |
| 86178 | 11/1965 | France . |
| 3601456 | 7/1986 | Germany . |
| 0084249 | 7/1983 | United Kingdom . |

*Primary Examiner*—David S. Martin
*Attorney, Agent, or Firm*—Bachman & LaPointe, P.C.

[57] ABSTRACT

The invention concerns a device for manipulating objects with a gripper or the like, which is connected with a gear unit and drive motor via at least one arm, the arm being provided with at least one hollow shaft, the rotary motion of which being transmissible to a following shaft.

9 Claims, 6 Drawing Sheets

DEVICE FOR MANIPULATING OBJECTS IN A GRIPPER OR THE LIKE

This is a continuation of application Ser. No. 08/295,735, filed as PCT/EP93/00418, Feb. 23, 1993, published as WO93/16848, Sep. 2, 1993, now abandoned.

BACKGROUND OF THE INVENTION

The invention concerns a device for manipulating objects with a gripper or the like, which is connected with a gear unit and drive motor via at least one arm, the arm being provided with at least one hollow shaft, the rotary motion of which being transmissible to a following shaft.

Manipulators of this type in diverse shapes and designs are known. They are used especially for manipulating and operating objects, for example in clean rooms or in nuclear plants. The purpose of the manipulators is that the user does not come in contact with the objects to be handled.

If, for example, objects are gripped and turned or operated, the gripper is designed correspondingly. In this case the concept of gripper is to include all possible handling devices, and in the present case is not to be limited to a special area of application.

As a rule, known manipulators work with a number of arm pieces, which are connected by means of articulated joints. The motion of these arm pieces takes place, for example via a belt-and-pulley arrangement or the like.

However, DE-OS 37 34 179 concerns a motion transmission in the case of which a number of hollow shafts turn inside one another and in each case the edges of these hollow shafts are provided with a helical gearing, via which the corresponding motion also may be transmitted via an articulated joint. A transmission of this kind by means of hollow shafts and helical gearing has significant advantages over belt-and-pulley arrangements, especially with respect to the drive and the sureness of transmission of the motion. In addition, repairing manipulators of this kind is a problem, since for example in the case of wear of the helical gearing the entire hollow shaft has to be replaced. Further, the use is greatly complicated by the necessity of a large number of ball bearings.

SUMMARY OF THE INVENTION

The task of the present invention is to create a device of the above-mentioned type, in the case of which the assembly of the individual parts, the mounting thereof, and the replacement thereof are significantly simplified.

The hollow shaft engages with tines in recesses in a coupling piece, a helical gearing being set on the coupling piece on the other end.

With this the hollow shaft is uncoupled from the actual coupling piece, so that in the case of wear of this coupling piece, and of a helical gearing mounted on it, the hollow shaft does not also have to be replaced, but only the coupling piece can be removed from the arm and repaired. Since the corresponding ball bearings also are located on this coupling piece, this creates a special component which can be inserted separately and without great difficulty into an arm. Then it is necessary only that the hollow shaft find its coupling with this coupling piece, which is provided by the tines.

Preferably the tines engage not only into corresponding recesses in the coupling piece, but insertion pieces project out of the coupling piece into corresponding valleys between the tines. This interlocking ensures that the hollow shaft and the coupling piece are held together well.

Each tine has a shaft part which is bordered by side surfaces toward the valleys. For manufacturing reasons it has proven to be favorable if the side surfaces of opposite tines in each case are arranged in a common axis-parallel plane. In this way these side surfaces may be produced together in only one working process.

In the operating position the side surfaces work together with correspondingly shaped supporting surfaces on the inserts. Since these side surfaces of opposite inserts also lie in an axis-parallel plane, a favorable connection already is provided.

However, a significant advantage of the present invention lies in the fact that the side surfaces of the tines are covered with convex ridges of material. In this way not only is the precise fitting of the coupling piece to the hollow shaft increased, but because of its linear position on the supporting surfaces the convexity also ensures the possibility of tipping the hollow shaft with respect to the coupling piece to a certain degree. In particular in this way it is possible to compensate for the disadvantage that the axis of the hollow shaft does not run precisely in the axis of the coupling piece.

It is self-evident that the convex ridges also may be molded on the supporting surfaces of the insert. This concept also is to be covered by the present invention.

Preferably inclined planes, which interact with inclined planes of the inserts, are molded on the tines up to the tip. In this case the inclined planes of the inserts are made so that inclined planes of two adjacent inserts pass in a plane which is located at an angle to the axis of the coupling piece. Since in this way these inclined planes form a triangular roof surface on the tip of the insert, when the tines or the inclines planes thereof meet the inclined planes of the inserts, the tines slide into the receptacle, by means of which coupling piece and hollow shaft are centered extremely precisely.

For manufacturing reasons it has proven to be advisable if the tines are not molded directly in the hollow shaft, but represent a part of a separate connecting piece, which rests with a corresponding connecting sleeve in the hollow shaft.

A further part of the invention concerns a device for manipulating objects with a gripper or the like, which is connected with a gear unit and a drive motor via at least two arms, and articulated joints angled to one another, there being in the arm, and in the articulated joint, at least one hollow shaft, the rotary motion of which may be transmitted via a bevel gear to a bevel gear of a following hollow shaft. The bevel gear positions at least one ball bearing in place on the hollow shaft, a mounting ring being attached to a front face of the hollow shaft by means of bolts and presses on a step of the bevel gear with a shoulder.

The bevel gear projects slightly over the front surface of the hollow shaft in order to be able to hold the bearing in place. When the mounting ring is screwed on, the shoulder thereof presses on the step of the bevel gear, the pressure of the bevel gear being transferred onto the ball bearing, and corresponding bearing sleeves and supporting rings. In this case practice has shown that at the time of fastening by means of the bolts, the mounting ring bends in relation to the front surface, and to the step of the bevel gear, which led to the fact that the heads broke off when the bolts were tightened. In accordance with the invention this may be eliminated by having the bolt head engage in a receptacle in the mounting ring, the base of which receptacle is beveled, and rounded. Preferably also the lower bearing surface of the bolt head, which also lies in the receptacle, also is to be correspondingly bevelled, and rounded. It has proven to be the case that this can prevent the bolt head from being broken off.

Altogether the present invention provides a connection between a coupling piece and a hollow shaft, which can be made blindly, i.e. without visible contact within an arm, the tines seeking out their corresponding receptacles quasi independently. The connection finally achieved fits accurately and is always repeatable.

BRIEF DESCRIPTION OF THE DRAWINGS

Further advantages, features, and details of the invention are demonstrated in the following description of preferred embodiments as well as by means of the drawings, wherein.

DETAILED DESCRIPTION OF PREFERRED EMBODIMENTS

Figure 1:
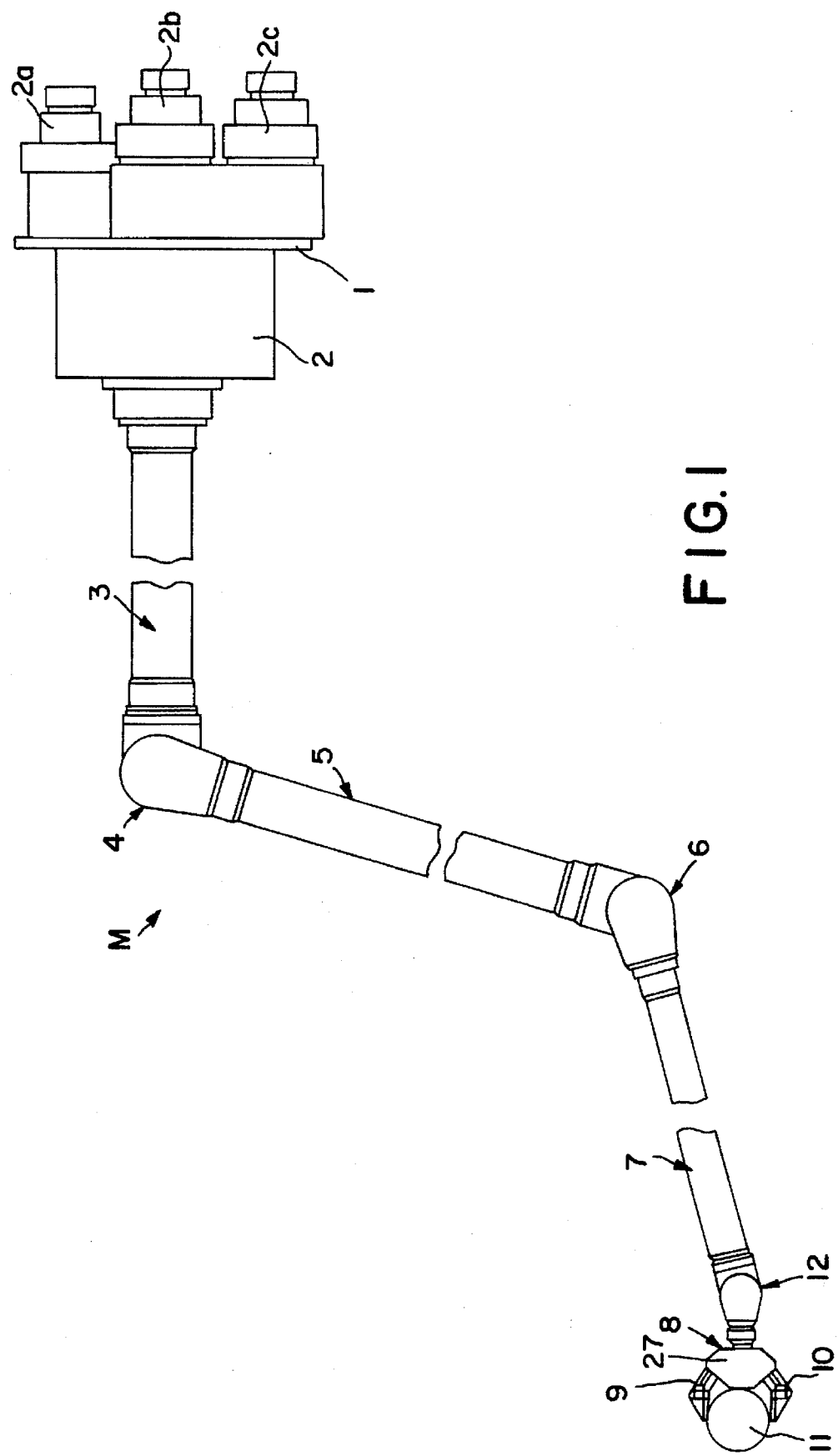
FIG. 1 shows a top view of a manipulator in accordance with the invention.

As shown in FIG. 1, a manipulator has an assembly plate 1, on which on one side there are mounted a number of individual motors 2a, 2b, 2c, the drive shaft of which of course passes through the assembly plate 1 and interacts with a gear unit in a gear box 2. This gear unit consists of a series of drive shafts and gears, via which in each case the corresponding motor rotation is transmitted to hollow shafts 13 described later.

A first set of hollow shafts is located in an upper arm 3, to which a middle arm 5 connects via an articulated joint 4. Via a further articulated joint 6 middle arm 5 turns into a lower arm 7, to the end of which a gripper 8 is connected. The gripper 8 holds an object 11 with tong arms 9 and 10. In the case of the transition from upper arm 3 to the middle arm 5, and from the middle arm 5 to the lower arm 7, it is obvious that the diameter of the respective arm decreases, since in each case a hollow shaft set drops out, via which the following arm is driven.

Figure 2:
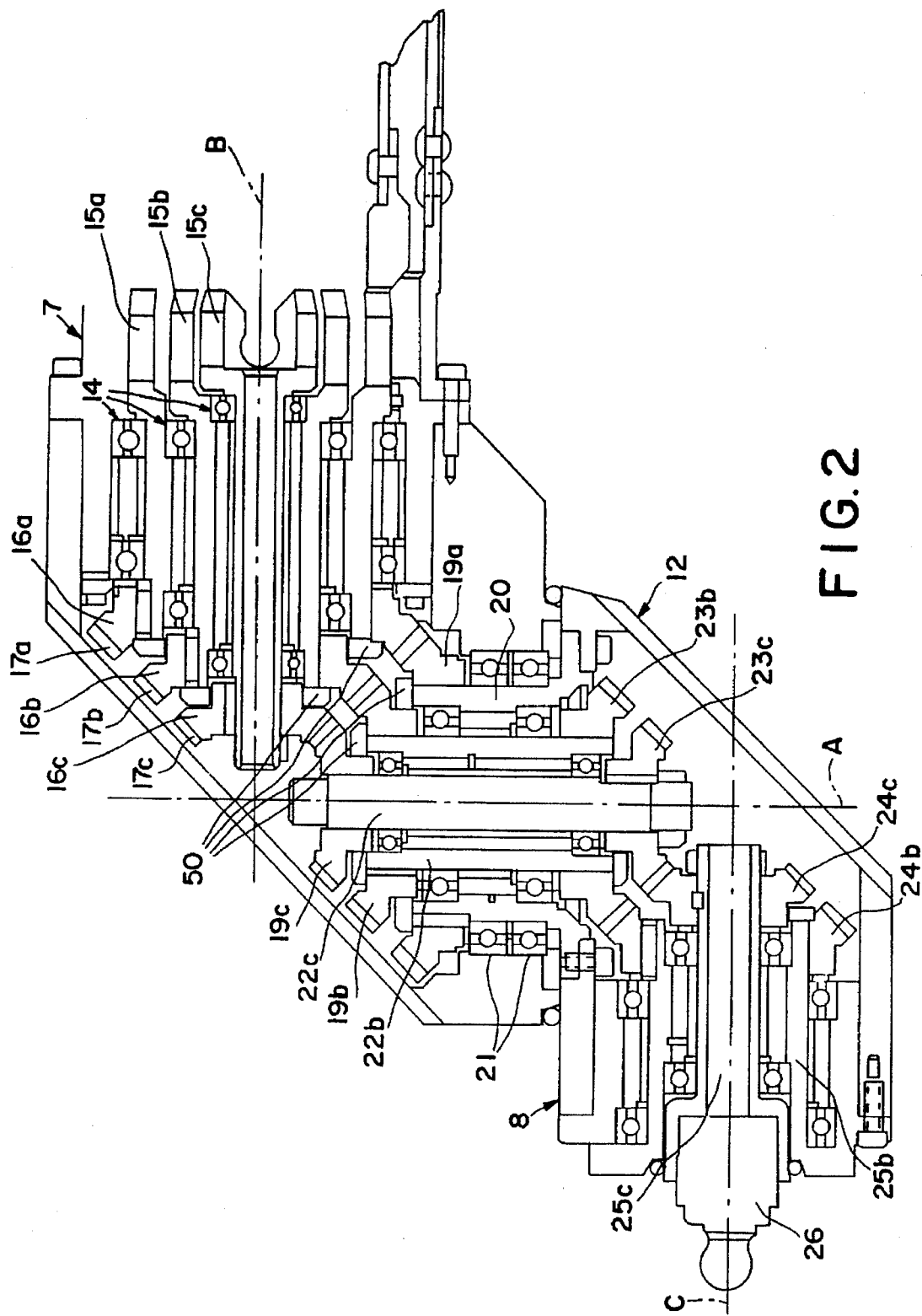
FIG. 2 shows a longitudinal section through a part of the invention in accordance with FIG. 1 in the area of an articulated joint.

FIG. 2 shows a cross-section of an area of an articulated joint 12 between lower arm 7 and gripper 8. Here it is evident that from the lower arm 7 there are only three more hollow shafts, to which coupling pieces 15a, 15b, and 15c connect, which are supported against one another via ball bearings 14 on the other side a bevel gear 16a, 16b, and 16c is placed on each coupling piece 15 with a helical gearing 17a, 17b, and 17c.

Figure 3:
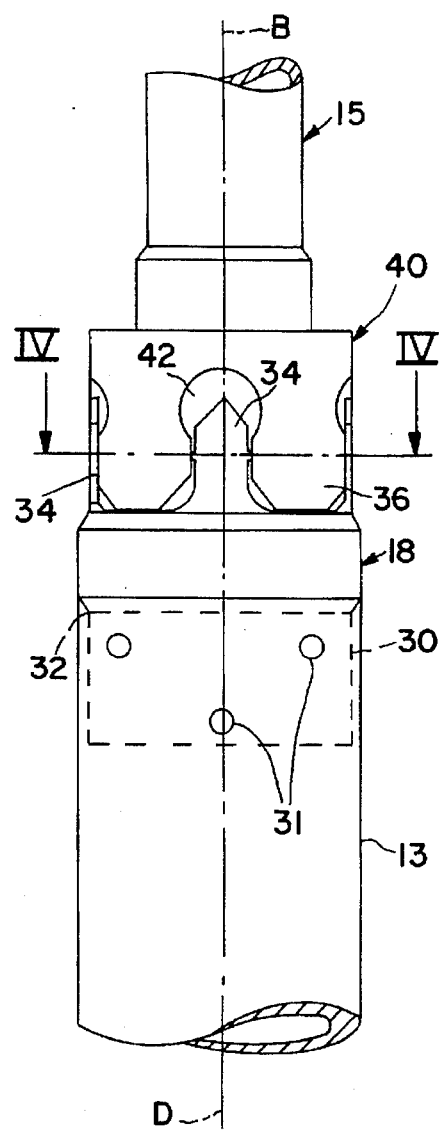
FIG. 3 shows a top view of a connection in accordance with the invention.
Figure 4:
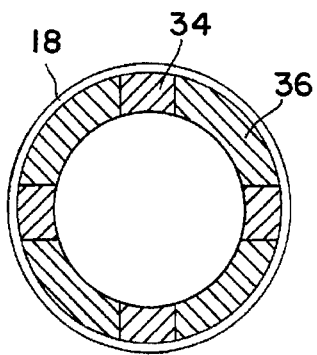
FIG. 4 shows a cross-section through the connection in accordance with FIG. 3 along line IV—IV.
Figure 5:
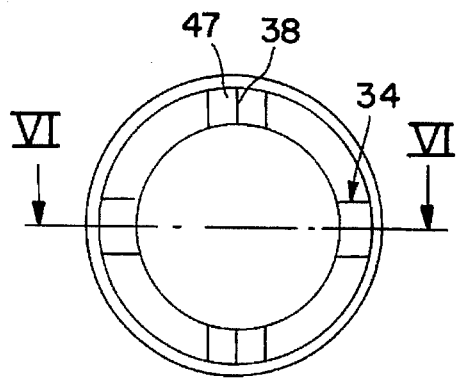
FIG. 5 shows a top view of a connecting piece.
Figure 6:
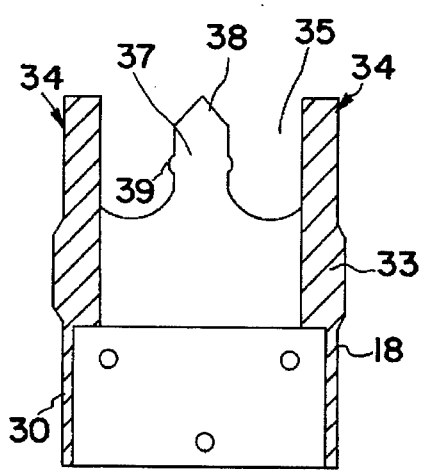
FIG. 6 shows a cross-section through the connecting piece in accordance with FIG. 5 along line VI—VI.

A connecting piece 18 connects to the coupling piece 15 towards the hollow shaft 13, as is shown in FIGS. 3, 5, and 6. In this case the connecting piece is connected tightly with a tubular section, which passes through the entire length of arms 3, 5, and 7, up to the next articulated joint 4, 6, and 12 respectively.

The outermost bevel gear 16a transfers its rotary motion to a bevel gear 19a, which is set on an arm stump 20 of the articulated joint 12. The axis A of the arm stump 20, and articulated joint 12, passes perpendicular to an axis B of the lower arm 7, and the hollow shaft 13, as well as also perpendicular to an axis C of the connecting gripper 8. Moreover, the arm stump 20 turns in two ball bearings 21, so that the gripper 8 is rotated around the axis A.

Within the arm stump 20 there are set in one another two further hollow shafts 22b and 22c, the bevel gears 19b and 19c which receive the rotary motion of the bevel gears 16b and 16c. This rotary motion is transferred via the hollow shafts 22b and 22c to two further bevel gears 23b and 23c, the rotary motion thereof again being transferred by two bevel gears 24b and 24c to corresponding hollow shafts 25b and 25c. Then a coupling 26 for a corresponding gripping hand 27 rests in the hollow shaft 25c.

As shown in FIG. 3 the connecting piece 18 is provided for a releasable connection between a hollow shaft 13 and a coupling piece 15. This connecting piece 18 plugs into the hollow shaft 13 with a connecting sleeve and is secured in the shaft by means of connecting elements, not shown in greater detail, which interact with holes 31 in the connecting sleeve 30. In addition, the depth of insertion of the connecting piece 18 into the hollow shaft 13 is limited by a stop shoulder 32.

A ring 33, better shown in FIG. 6, from which tines 34 project, follows the connecting sleeve 30. In each case between two tines 34 there is a valley 35, into which an insertion piece 36 from the coupling piece 15 engages in order to make the connection.

In the present embodiment each tine 34 has an arrowhead shape of an approximately rectangular shaft part 37 and a superimposed point 38. It is essential that a buildup of material as covex ridges by molded to the sides of the shaft part 37 in each case toward a valley 35. These convex ridges on both sides support each tine 34 against two adjacent inserts 36 of the coupling piece 15, the accuracy of fit being increased significantly in this way. A possible displacement of coupling piece 15 with respect to the connecting piece 18 is avoided in this way, however the possibility of a certain amount of angular motion remains, so that the axis B of the coupling piece 15 does not necessarily have to coincide directly with the axis D of the hollow shaft. As a rule this is indeed the case, as is shown in FIG. 3, but the convexity of the tines 34 also makes it possible to have a slight angular offset of the two axes B and D to one another.

Figure 7:
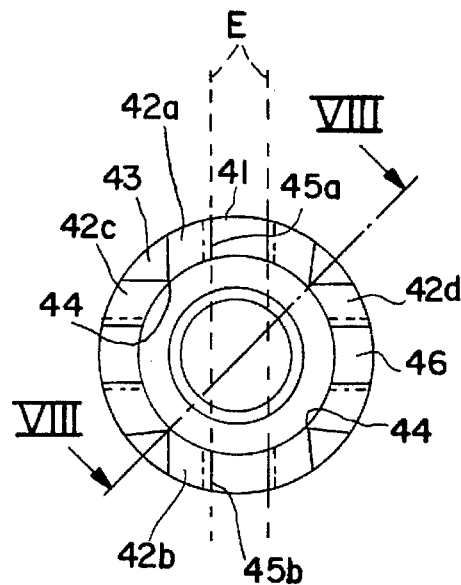
FIG. 7 shows a top view of a coupling piece.
Figure 8:
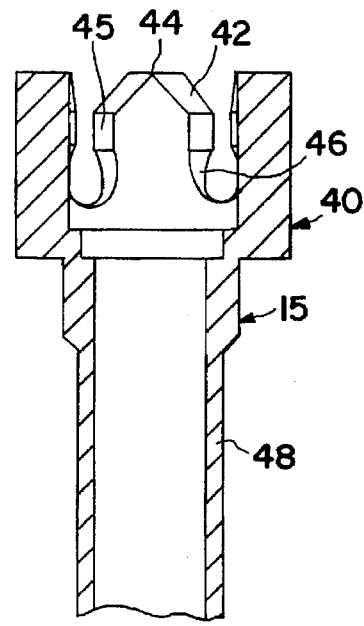
FIG. 8 shows a cross-section through the coupling piece in accordance with FIG. 7 along line VIII—VIII.

The inserts 36 are part of a ring piece 40, in each case two inserts leaving free between them a receptacle into which the tines 34 engage. Also the form of the inserts 36 and the receptacle 41 is of great significance. For this in FIGS. 7 and 8 it is recognizable that each insert 36 has an inclined surface 42 toward each receptacle 41, the inclined surfaces 42a and 42b or 42c and 42d, which in each case lie opposite each other as secants, being arranged in a plane. This statement also obtains for the other inclined planes 42 even when, for example, six inserts are used instead of only four inserts 36.

The inclined planes 42a and 42c of an insert 36 meet in a triangular roof surface 43, in which case each rectangular roof surface 43 with a tip 44 points radially to an opposite tip 44 of the opposite insert.

In the receptacle 41 a supporting surface 45, against which the tine 34 supports itself with the convex ridge 39, borders the inclined plane 42.

The inclined planes 45a and 45b of adjacent inserts 36 are located in a common axis-parallel plane E, which is represented with dashed lines.

A rounded base of the recess 46 borders this inclined plane 45 and connects two adjacent supporting surfaces with one another.

This configuration of the inserts 36 and recesses 41 causes the tines 34, wherever they strike the inserts 36 with their tips 38, to slide on the inclined surfaces 42 and to be guided into the receptacles 41, so that in each case there is an absolutely sure and correct centering of coupling piece and connecting piece. There is not offset of the axes B and D, only the convexity permits one axis to bend away respect to the other to a limited degree. This guiding of the connecting piece is of particular advantage especially when a manipulator of this type is repaired, i.e. when hollow shafts are inserted into an existing arm, which shafts have to seek out their corresponding coupling piece without optical assistance. As soon as the connecting piece 18 strikes the coupling piece 15, the coupling piece 15 is turned to the correct position, the tines 34, which themselves have inclined planes 47 as a result of the formation of the tips 38, slide along the inclined planes 42 until they plug into the receptacle 41.

In addition, the ring piece 40 is connected to a hollow shaft 48, on which then on the other end of the ring piece 40 the corresponding bevel gear 23 is placed.

Figure 9:
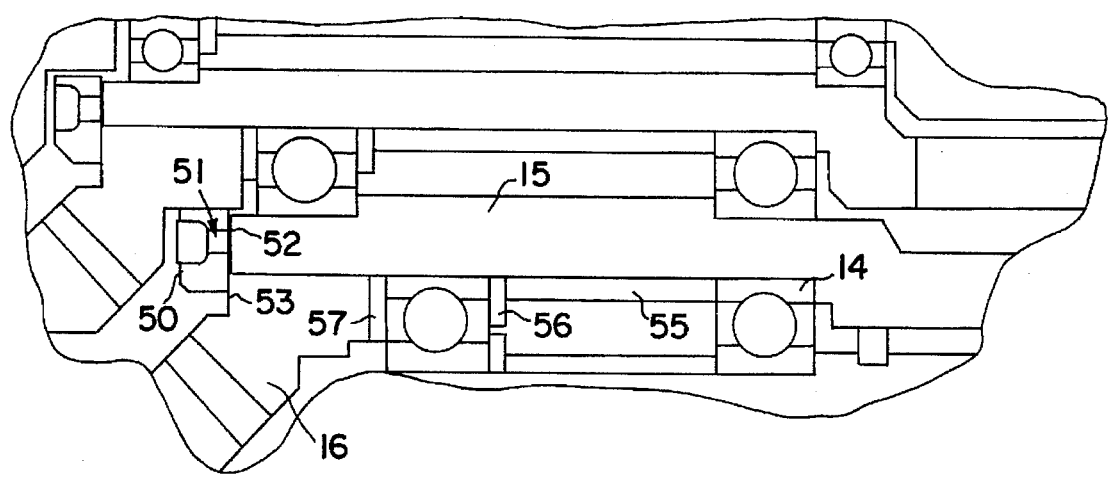
FIG. 9 shows a section from FIG. 2 in the area of a coupling piece with a bevel gear.
Figure 10:
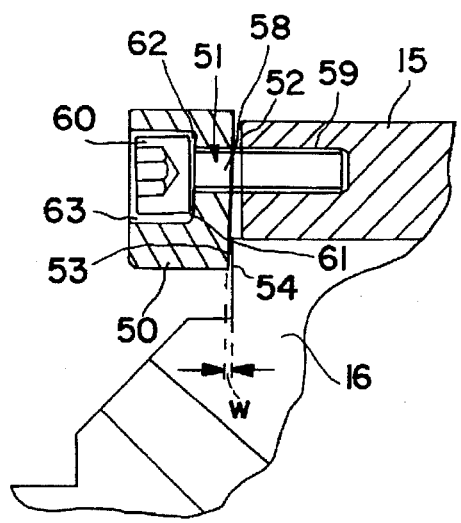
FIG. 10 shows a magnified section form FIG. 9 in the area of the mounting of a bevel gear on a coupling piece.

A further significant problem has appeared in the case of the placing of the bevel gears 16. The bevel gears 16 in each case are fastened over a mounting ring 50 on coupling pieces 15 on the other side of the ring piece 40. For this they are fastened by means of a countersunk bolt 51 on a front surface 52 of the coupling piece 15, in which case, however, they project over the coupling piece 15 and with a shoulder 53 press on a step 54 of the bevel gear 16 pushed onto the coupling piece 15 (see FIG. 9). Since the bearings 14 are held in position between a corresponding bearing sleeve 55 and supporting rings 56 and 57 by means of the bevelled gear 16, the step 54 should project somewhat over the plane of the front face 52, so that the shoulder 53 pushes the bevelled gear 16 into the supporting ring 57 in order to hold the bearing 14 in position. In this case, of course, there is a deformation of the mounting ring 50, as is indicated exaggerated in FIG. 10. The mounting ring is set transverse in relation to the front face 42 and to the step 54, a spacing angle w being created.

If the bolt 51 with its threaded shaft 58 now is screwed into a threaded hole 59 in the coupling piece 15, the bolt head 60, respectively its lower bearing surface area 61 meets a counterbore base 62 of a head counterbore 63. If the bolt 51 is retightened so that the mounting ring 50 is inclined, the counterbore base 62 also is removed from the lower pressure surface 61 by the same spacing angle w, so that only a point of the lower bearing surface area 61 rests on the counterbore base 62. The consequence of this is that the bolt head 60 snaps off the threaded shaft 58. It is no longer possible to hold the bevel gear 16.

Figure 11:
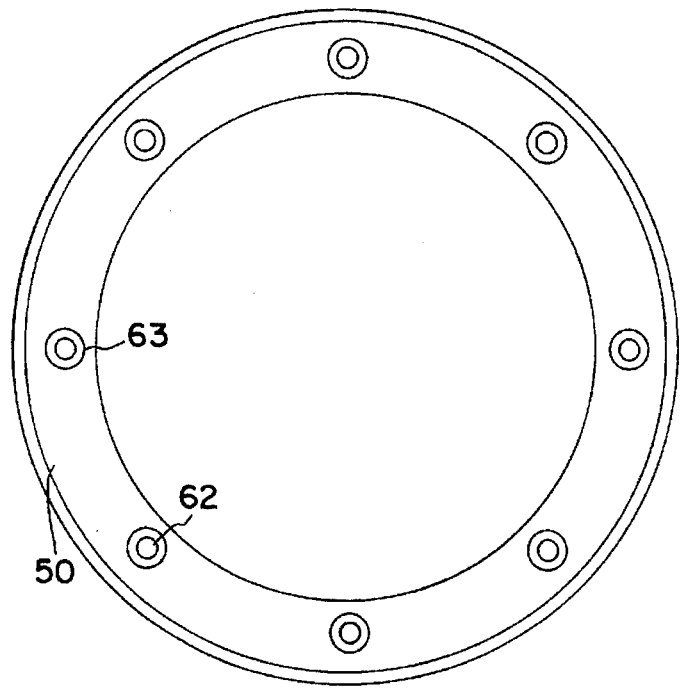
FIG. 11 shows a top view of a fastening ring.
Figure 12:
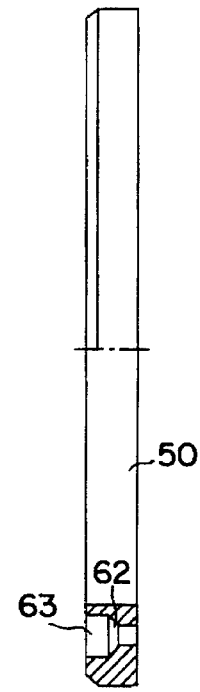
FIG. 12 shows a cross-section through the fastening ring as shown in FIG. 11.
Figure 13:
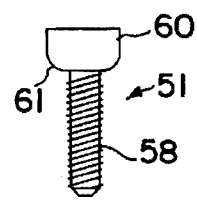
FIG. 13 shows a top view of a bolt invented for mounting the fastening ring in accordance with FIGS. 11 and 12.

However, this disadvantage may be prevented by bevelling, respectively rounding of the base of the counterbore 62, as is shown in FIGS. 11 and 12. At the same time the lower bearing surface 61 of the bolt 51 is made rounded, as is shown in FIG. 13. In this way a flat bearing remains between the lower bearing surface 61 and the counterbore base 62 over wide areas even in the case of bending of the mounting ring 50, and practice has shown that the bolt head 60 no longer snaps off. This a very considerable advantage of the present invention. The counterbore base produces nearly a cup socket for spherical lower bearing surface 61.

I claim:

1. A device for manipulating objects, which comprises: a gripper means connected with at least one drive and at least one drive motor via at least one arm; wherein said arm comprises at least one hollow shaft with a plurality of tines projecting therefrom and valleys between the tines; a receptacle in a coupling piece having inserts thereof, said coupling piece aligned with a hollow shaft, and the coupling piece inserts engaging with the valleys between the tines in order to transfer rotary motion to a hollow shaft; a helical gearing mounted on one end of the coupling piece; wherein each tine has a shaft part, and wherein the side surfaces of opposite tines point toward the valleys and are arranged in an axis-parallel plane; and wherein each insert has supporting surfaces toward the receptacle, the supporting surfaces of opposite inserts also lying in an axis-parallel plane.

2. A device in accordance with claim 1, wherein said shaft part includes a point adjacent thereto, including the formation of two inclined planes, wherein each inclined plane is adjacent to a supporting surface.

3. A device in accordance with claim 2, wherein the inclined planes of two adjacent inserts line up in one plane, which runs at an angle to the axis of the coupling piece.

4. A device in accordance with claim 3, wherein the inclined planes of an insert form a triangular roof surface, and wherein the tips of opposite inserts are arranged radially opposite each other.

5. A device in accordance with claim 1, wherein the side surfaces have convex ridges.

6. A device in accordance with claim 1, wherein a rounded receiving base is adjacent to the supporting surfaces.

7. A device in accordance with claim 1, wherein the tines are molded out of a connecting piece, which sits in a hollow shaft with a connecting sleeve.

8. A device for manipulating objects, which comprises: gripper means which is connected with at least one gear unit and at least one drive motor via at least two arms forming an angle to one another, said arms being provided with at least one hollow shaft, the rotary motion of which is transferred to a bevel gear of a following hollow shaft, which bevel gear supports at least one ball bearing; a mounting ring fastened on a front face of a hollow shaft by means of bolts and pressing on a step means of the bevel gear; wherein a bolt head of the bolt is countersunk in a counterbore of the mounting ring and lies against a counterbore base with a lower bearing surface, at least one of the counterbore base and lower bearing surface being made bevelled.

9. A device according to claim 8, wherein at least one of the counterbore base and lower bearing surface being made rounded.

* * * * *